(12) United States Patent  
Cullen

(10) Patent No.: US 9,020,526 B1  
(45) Date of Patent: Apr. 28, 2015

(54) EXTENSIBLE TRACKING SYSTEM

(71) Applicant: William M. Cullen, Cambridge, MA (US)

(72) Inventor: William M. Cullen, Cambridge, MA (US)

(*) Notice: Subject to any disclaimer, the term of this patent is extended or adjusted under 35 U.S.C. 154(b) by 287 days.

(21) Appl. No.: 13/755,355

(22) Filed: Jan. 31, 2013

Related U.S. Application Data

(60) Provisional application No. 61/594,431, filed on Feb. 3, 2012.

(51) Int. Cl.
*H04W 24/00* (2009.01)
*H04M 11/04* (2006.01)

(52) U.S. Cl.
CPC ................... *H04W 24/00* (2013.01)

(58) Field of Classification Search
USPC ............................ 455/456.1, 404.2
See application file for complete search history.

(56) References Cited

U.S. PATENT DOCUMENTS

| | | | |
|---|---|---|---|
| 6,298,306 B1 * | 10/2001 | Suarez et al. ............... 701/484 |
| 6,317,049 B1 | 11/2001 | Toubia et al. | |
| 7,228,228 B2 | 6/2007 | Bartlett et al. | |
| 7,268,680 B2 | 9/2007 | Gary, Jr. | |
| 8,228,171 B2 | 7/2012 | Bauchot et al. | |
| 8,248,239 B2 | 8/2012 | Butler et al. | |
| 8,289,129 B2 | 10/2012 | Bauchot et al. | |
| 8,502,674 B1 * | 8/2013 | Cole ........................ 340/572.4 |
| 2004/0214568 A1 | 10/2004 | Anderson | |
| 2010/0267361 A1 | 10/2010 | Sullivan | |

FOREIGN PATENT DOCUMENTS

| | | |
|---|---|---|
| EP | 1271176 A2 | 1/2003 |
| WO | WO 99/17132 A1 | 4/1999 |
| WO | WO 2005/089230 A2 | 9/2005 |
| WO | WO 2006/065238 A1 | 6/2006 |
| WO | WO 2006/108071 A2 | 10/2006 |

OTHER PUBLICATIONS

Leowristwatch.com/mian/index.php?option=com_content&view=article&id=34&itemid=114, "How It Works—LEO the device" retrieved from the Internet Jan. 16, 2013, 3 pages.
http://www8.garmin.com/aboutGarmin/ 'Garmin Astro Dog Tracking System' Information Sheets, 5 pages.

* cited by examiner

*Primary Examiner* — Omoniyi Obayanju

(57) ABSTRACT

A system and method for an extensible tracking system. A set of autonomous tags detect their location such as via GPS and broadcast their location to other nearby tags. Using separate communication technology, each tag can also communicate with an associated user device such as a smart phone. The user device(s) provide a user interface for queries into the system. The broadcasts among all tracking devices insures no reliance on a single tracking device, and associating tags with a respective set of user devices eliminates reliance on a central system for tracking to locations of all tags.

12 Claims, 7 Drawing Sheets

EXTENSIBLE TRACKING SYSTEM

CROSS REFERENCE TO RELATED APPLICATION(S)

This application claims the benefit of a prior U.S. Provisional Patent Application Ser. No. 61/594,431 filed Feb. 3, 2012, the entire contents of which are hereby incorporated by reference herein.

INTRODUCTION

1. Technical Field

The present system relates to using a tracking device to identify the location of a person, animal or object with a particular emphasis on situations where an item or individual may be not be able to assist in being located.

2. Background Information

On a disturbingly regular basis many people, animals, and objects are lost in all manner of activities including hiking, dog walking, and even while shopping. Certain populations, such as animals and individuals with Alzheimer's who cannot navigate or communicate a location, need to be tracked and face significant danger if left unattended and roaming outside. To date, specialized radio frequency devices and family radios based on Family Radio Service (FRS) technology have been offered to locate and track individuals using position information received from Global Positioning System (GPS) satellites. In addition, cell-based devices have been introduced more recently which use cellular data connections to communicate GPS or cell tower derived position information to a central Web site or directly to a smartphone.

The current approaches have not resulted in widespread adoption of tracking systems due to the high cost of dedicated proprietary radio receivers and displays, as well as monthly costs typically charged in cell tracking systems which consist of cell data charges and service charges for maintaining a tracking service in a central site. In addition, radio-based devices today are typically based on a single proprietary tracking receiver, which only allows a single individual to track and inhibits third parties from tracking unless they have the appropriate technology. Cell systems frequently suffer from latencies in providing location information, making real time tracking impossible. Many systems also have a limited battery life due to being part of a radio, phone or other technology with high power consumption, eliminating the chances of tracking success in a longer term rescue operation. The lack of a simple low cost device for locating people, animals, and objects continues to result in a long rescue times, large search and rescue operations, and fatalities. There are many other activities beyond rescue operations where tracking is useful to coordinate the movements and destinations of individuals. Hunting trips, hiking expeditions, biking and similar activities are examples where individuals are geographically dispersed but their positional information is helpful as part of coordinating their activity. In the case of hunting, knowing the location of fellow hunters provides an extra margin of safety. Many of these activities occur in areas that are not served by cell networks, or have geographic features that block cell communication.

SUMMARY

The present invention aims to leverage existing and emerging radio spectrum along with fully open hardware and software to make tracking technology inexpensive, ubiquitous, and able to function in the many areas where cell connections are not available. A low cost approach makes it more likely tracking will be used in common everyday scenarios and an open approach insures that tracking will not be constrained by technological barriers.

What is disclosed is a system of individual tracking devices based on radio broadcasts among all devices, such that each device will have full information on the location and status of other devices. The devices will be attached to people, animals or objects to enable them to be tracked by using the information that is broadcast. There is no central location that holds the tracking information. Rather, each device retains tracking information for all other devices within its broadcast range. Each device uses GPS technology to determine its own location. Multiple communication technologies may be employed for the broadcasts between devices, which allows for current technology such as the General Mobile Radio Service (GMRS) radio bands to be used, as well as future frequency allocations that are currently emerging and that promise far greater range and less interference.

The location information held by each tracking device is broadcast not only to other devices, but also is be communicated to common general purpose computing devices, such a cell phone or computer, using standard short range wireless protocols such as Bluetooth. The general purpose computing device is used to process and convey the information in a user interface designed for tracking. The separation of the broadcast-based tracking device from the general purpose processing and user interface device allows for a tracking device design with a long battery life, small size, and low cost. These attributes are intended to promote widespread use of tracking technology resulting in a far greater chance of a successful rescue than what is currently available on the market today.

In an emergency situation, where the ability to track and locate is vital, it is essential for the core tracking device to have long battery life, long communication range, and durability. The separate communication channels allow the tracking devices to use radio spectrum highly efficiently when sharing position information between devices, while only incurring the overhead of communicating to a general purpose computing device when a user is accessing the tracking information. For example, if a person with a cell phone and a tracking device were to become lost, the tracking device will continue to function long after the cell phone has run out of power. Any individual with a tracking device and a working cell phone would still be able to locate the lost individual.

The general purpose computing device is also used to configure and monitor the tracking device and by nature is extensible to allow tracking data to be used in new ways and to add new functionality for users as new implementations of the tracking system are developed over time.

Each tracking device has a unique identity to avoid any conflicts in communication. In addition, the ability to signal an emergency if an individual is able to do so is a fundamental starting point for a rescue. Each device thus allows an emergency mode to be activated by an individual using a switch on the device itself. The emergency status of a device is also broadcast along with position information.

The computing power and rapid adoption of smartphones, tablets, and other similar general purpose computing devices allows many tracking features beyond simple location information to be utilized on demand by downloading an appropriate application. Examples include detecting movement outside of a predefined area, and displaying general trends in direction and speed. The use of a general purpose computing device allows new tracking functionality to be added to the user interface at any time without changing the basic tracking device technology. These applications communicate with the tracking device to obtain location and status information, but then may process it in any way that is useful.

A general purpose computing device such as a smart phone may also use its own capabilities to enhance tracking functionality. For example, in an emergency rescue, it is possible the Internet could be used to communicate the identity of a lost tracking device between general purpose devices to set up an alert. Should the missing device enter the communication range of a tracking device being monitored, the user can take action based on the nature of the alert. Cell phone technology in the general purpose device can be used for such purposes.

The functionality of the tracking device itself may also be enhanced by downloading new software to it. The device is based on an open hardware computing platform and open source software. The ability to add additional processing, communication protocols and other types of information allows unforeseen functionality to be added over time to both the tracking device in addition to the general purpose device. Additional hardware can be introduced that builds on the basic tracking device design to add information such as compass orientation or acceleration measurements for specific use cases.

The broadcast-based communication that is the basis of the tracking system allows individual devices to be the source and collection point of location and status information for other devices. Tracking devices also can optionally rebroadcast such information which allows other nearby devices that are out of transmission range of the original broadcasting device to receive its information. The rebroadcast capability allows each device to act as a bridge between devices within its communication range that are not be able to communicate directly because they are too far apart. The result is a system which can provide tracking information among all devices even if some of the devices are out of communication range with each other.

Each device can receive, broadcast and rebroadcast if configured to do so. There is no central point of information collection and each device is functionally equivalent in the system. A user interface may process and display information originating from any of the devices broadcasting in the system by communicating with only one tracking device. There is no single point of failure in the system and multiple user interface devices may be used simultaneously.

Today, many tracking and rescue tasks are ultimately accomplished using visual sightings, scent following dogs, and expensive machines such as helicopters. The tracking device design introduces the potential for new approaches to tracking and rescue operations. For example, the low cost makes tracking economically feasible for scenarios such as finding a missing animal on a large ranch, or keeping track of skiing partners in the outback. As another example, the small device size and broadcast functionality allow rescue operations to use small unmanned aircraft. An aircraft with a tracking device can broadcast and receive position information over a greater range due to the lack of physical obstructions and rebroadcast tracking device information to create a broader search area and reduce the need for full size aircraft and more sophisticated approaches such as infrared camera searches.

BRIEF DESCRIPTION OF THE DRAWINGS

The description below refers to the accompanying drawings as follows.

DETAILED DESCRIPTION OF AN EMBODIMENT

A broadcast-based tracking system of the type described herein consists of a set of autonomous tracking devices which will be subsequently called "tags" and/or "tracking devices" in this document. This terminology is based on the term "dog tag" which typically refers to an id on the collar of an animal as well as the identification tags used by military personnel.

Figure 1A:
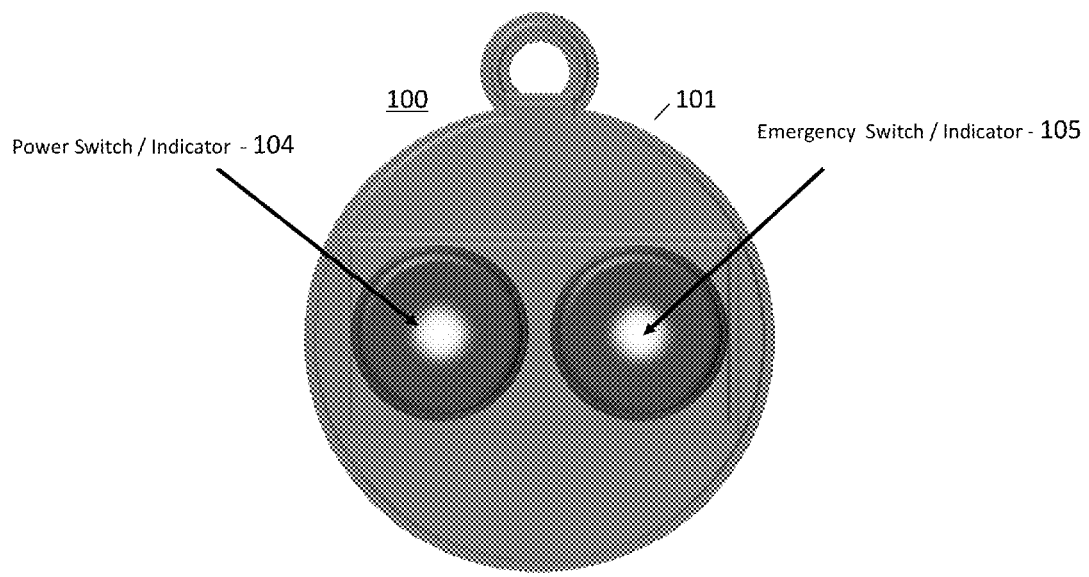
FIGS. 1A and 1B.—The basic tracking device physical designs. Differing tracking device case designs support differing means of attachment and various antenna designs.
Figure 1B:
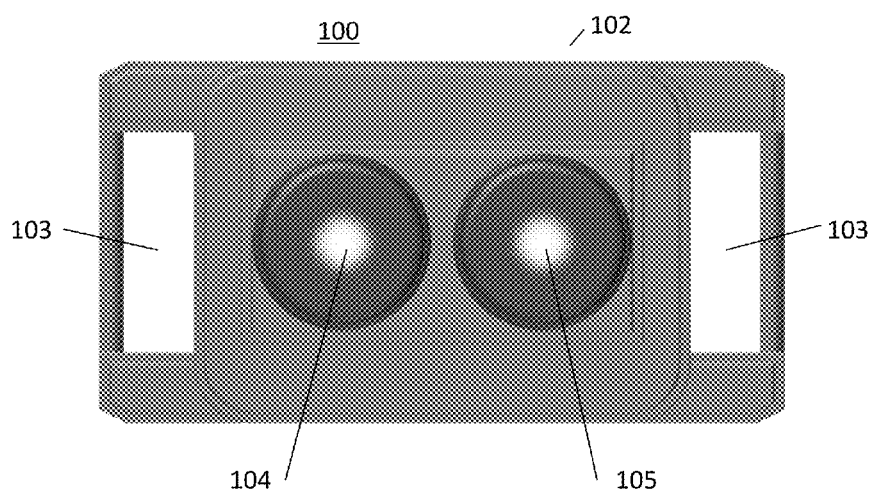

Referring first to FIGS. 1A and 1B, a couple of different physical arrangements can be used for the tags; thus the use of the word tag herein does not imply a single physical shape for tracking devices. The tracking device electronics may be housed in differently shaped casings designed to make the system more practical in specific use cases. For example, when used to track an animal such as a dog, the tag 100 will be housed in a small circular case 101 that is easily attached to a dog collar such as in FIG. 1A. In the case where an individual is being tracked, the casing 102 could be shaped as a ring, bracelet, pendent, or any other design which will make it easier to carry and use such as a rectangular pendant having holes 103 on each side that accommodate a strap holder as shown in FIG. 1B.

The casing 101 or 102 for the tag 100 is typically designed to be used in rugged environments and may have variants that are waterproof, impact resistant, etc. In all descriptions of the tracking device functionality, the use of the word tag 100 will not imply a specific case design or means to attach the tag 100 to a person, animal, or object or its physical enclosure type.

Figure 2:
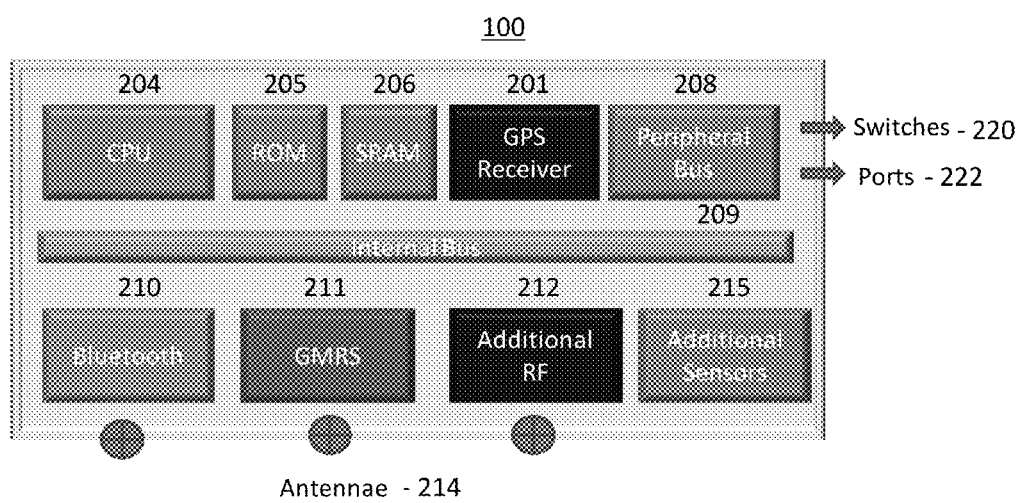
FIG. 2.—The logical design of the tracking device electronics including one or more buses allowing for additional components to be incorporated into the design at a later time.

Referring to FIG. 2, a tag 100 consists of a GPS receiver 201, power source 202, an embedded computing platform 203 using a processor 204, memory (such as Read Only Memory 205 or Static Random Access Memory 206), input/output channels such as to connect to switches 220 and/or ports 222, and two or more communication transmitters and receivers such as Bluetooth 210, GMRS 211, additional radios 212, etc.

A typical tag 100 would have minimal input/output device functions to keep the cost and power consumption as low as possible. In the examples shown in FIGS. 1A and 1B, the tags 100 included a power switch/indicator light 104 and emergency switch/indicator light 105.

The design is based on one or more extensible internal bus(es) 209 which allow additional sensors 215, such as an accelerometer, to be added at a later time. In the preferred embodiment, some aspects of the design are implemented on a single physical integrated circuit to reduce size and power needs. In one embodiment, the tag 100 allows external antennae 214 to be connected to the tag 100 to support communications using multiple RF technologies. External antennae 214 are designed in accordance with the tag 100 design to provide a practical implementation of the tracking system for specific use cases. For example, an antenna design for a dog might be flexible and have attachments points suitable for attaching to a collar.

Figure 3:
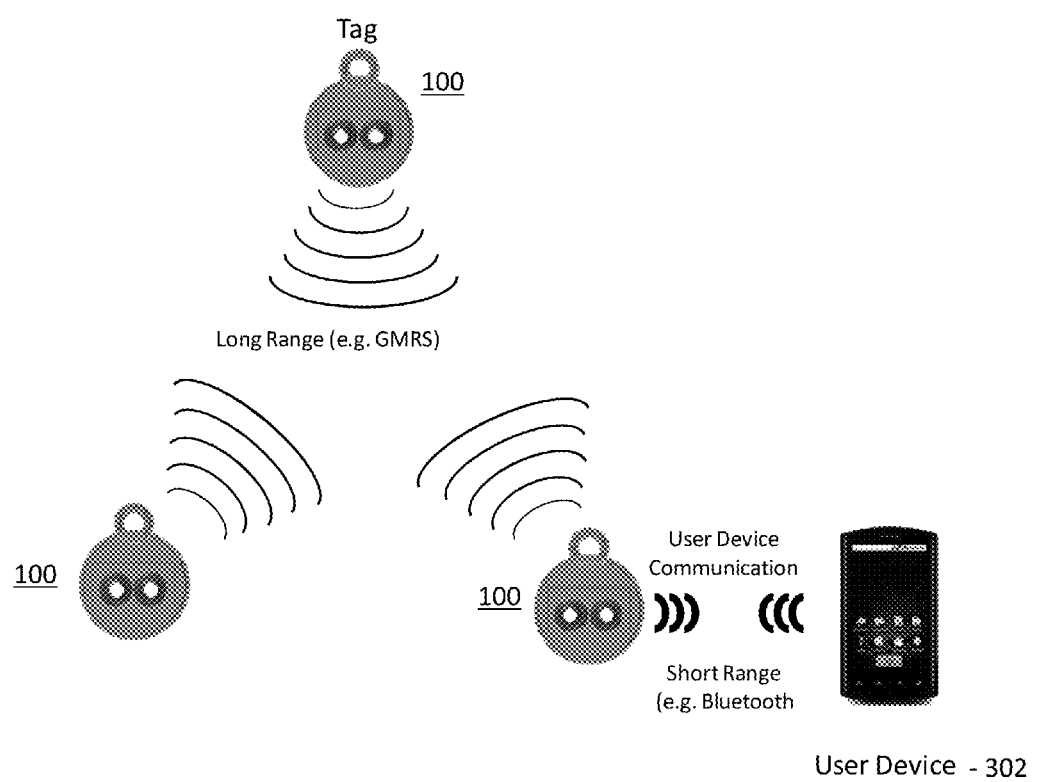
FIG. 3.—A diagram representing the separation of the tracking device from general purpose computing device. Broadcasts among tracking devices use a communication technology that is separate from that used to communicate with a general purpose computing device.

As mentioned already, an example tag 100 uses a GPS receiver to obtain its location. Tag 100 location information, after being detected, is then sent to other nearby tags 100 in the system using a relatively long range wireless communication channel. Referring to FIG. 3, the communication of location information among tags 100 is based on a broadcast model where each tag 100 receives all information broadcast from by all tags 100 within its communication range. The time interval between broadcasts is configurable for each tag 100 and can be set to a duration of multiple seconds or more to conserve power. The tag 100 retains its own location, and the location it has received from all the other tags 100 in memory, as well as additional information which is sent by each tag 100 such as its emergency status. In the preferred embodiment, the tag 100 will retain all information received from other tags 100 for a configurable duration of time so that a tracking history is available as needed to be queried via a user interface, as will be described below.

Each tag 100 contains a software accessible value (such as stored in memory 205 or 206) that uniquely identifies it to all other tags 100 in the tracking system. This value is unique among all tags 100 globally to avoid conflicts and is critical for the absolute identification of the tag 100 in a tracking situation. The value is added to each broadcast from each tag 100 to uniquely identify it. In the preferred embodiment additional values are added to the broadcast such as the tag's 100 emergency status (that is, depending on whether the wearer of the tag enabled the emergency switch) and a broadcast sequence number which differentiates one broadcast from subsequent ones. The broadcast format is flexible to allow additional information to be added at a later time and to enable adding features to the system. Examples include the time of day of the broadcast and the power status of the device. Broadcasts are made to all tags 100 in the system, enabling any tag 100 to support the full functionality of the tracking system and eliminate any single point of failure.

Because of the broadcast model for communication, the location information for all the tags 100 can be obtained by communicating with a single tag 100. Groups of individuals can use the tracking system simultaneously by communicating with any tag 100. Each individual will be presented with identical location information by the system based on the broadcasted information.

For a person to use the tracking system, an external general purpose computing device 302 communicates with at least one tag 100 using a second type of wireless communication channel. The general purpose computing device 302 can thus receive, process and display location and status information for all the tags 100 that were in the past within broadcast range of the single tag 100 with which it is communicating now. In this document going forward, the external computing device will be referred to as the user device 302. The user device 302 is the only means by which individuals or automated systems gain access to process the tracking system information to provide a record or display of tag 100 positions and derive additional information over time such as direction of travel and velocity. The user device 302 provides the user interface for the tracking system and may be enhanced with additional programming and incorporate other data such as maps and geographic information.

This separation of the user device 302 and the tag 100 is key to fundamental to the purpose of the tracking system. And by having each tag 100 associated with a specific one of the user devices 302, the overall system architecture also permits a single user device 302 to review received broadcast information from the tags directly, eliminating the need for a centralized computer to orchestrate queries for location information.

Figure 5:
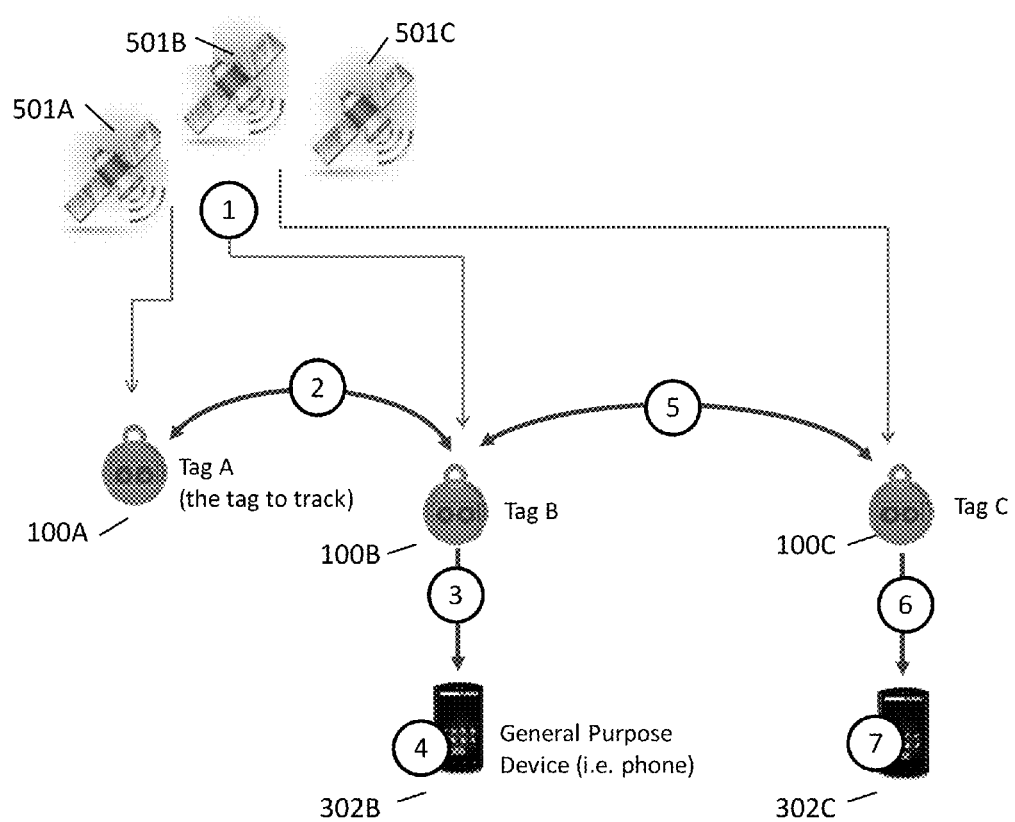
FIG. 5.—A diagram illustrating the exchange of tracking information between devices.

The basic message handling algorithm for tracking for the tags 100 is as per FIG. 5.

State 1. Tags 100A, 100B, 100C, obtain their location from GPS satellites 501A, 501B, 501C.

State 2. Tag 100A broadcasts it position information as well as emergency status. It also is receiving such information from other tags 100B in its range.

State 3. A receiving tag 100B in communication with a user device 302 receives the tracking information from other tags 100A and transmits it to the user device 302B it is communicating with directly by using a different protocol that was used for the broadcasts, such as Bluetooth.

State 4. The user device 302B provides a user interface that indicates the location of all the tags 100A, 100B, 100C being tracked and calculates items such as direction of travel.

5. The location of Tag 100A received at Tag 100B is also transmitted to Tag 100C if a hop count is not exceeded for the Tag 100A information.

6. The location of Tag 100A and Tag 100B are transmitted by Tag 100C to the user device 302C it is connected to.

7. The user device 302C connected to Tag 100C provides a user interface which shows all the tag 100A, 100B, 100C locations, providing the same information as the user device 302B connected to Tag 100B, but without the need of any centralized computer device to collect and distribute information.

More particularly, this design approach allows for a very simple tag 100 with low power requirements which has the ability operate for a long time, such as during extended rescues. The separation of the user device 302 and tag 100 allows for a low cost tag 100 design using only the circuitry required for tracking. The separation of the user interface from the tag 100 allows tags 100 to be small in size and support a wide range of uses such as being easily worn by a person, or attached to an animal or object. Multiple people may use the system simultaneously as peers by connecting to one or more individual tags 100 with respective user devices 302.

Tags 100 are designed to be extensible by adding new software over time. Additional functionality may be added to the tracking system by defining new items of data and supplying new software to both the tag 100 and the user devices 302. Tags 100 are designed to allow new software to be downloaded from an associated user device 302. The user devices 302, being general computing devices such as smart phones, are extensible using common techniques such as downloading new software from the Internet. However, if a new tag 100 design is created which has hardware to capture additional information, existing tags 100 may also be extended using downloaded software and/or software modifications to now rebroadcast the new information to other tags, even if they do not include such hardware or generate the new information themselves.

In one embodiment, operation of a tag 100 is extended to allow user devices to support text communication with one another indirectly using the broadcasts between tags 100 in the system. This feature requires a software program for each user device 302 to send to and listen for text traffic from a tag. The functionality of tag 100 is also extended with an additional software module for handling the text message traffic to and from the user device 302 as well as the other tags 100 in the tracking system. A protocol to handle the texts separately from other tracking broadcasts is defined and is only used when there is a text message, as opposed to the periodic broadcasts tracking requires.

In emergency situations, the ability to signal an emergency status to users of the system via the tag 100 or external user interface is critical. Tags 100 thus have a physical switch 105 (as shown in FIGS. 1A and 1B) allowing a user to signal an emergency to all the other tags 100 within range in the system. In one embodiment a hand operated switch to signal an emergency is added to the tag 100 case and is designed to avoid accidental activation. To signal an emergency, an individual must press the switch 105 in a particular way, such as twice within a four second interval. The switch 105 also contains a built-in LED indicator to show the emergency switch has been activated. In another embodiment, the switch and indicator may be physically separated.

Other types of switches, sensors 215 and activation methods can be used in future implementations for the same purpose, such as a switch triggered by exposure to water, or a switch triggered by rapid acceleration as might be experienced in an accident or fall. A tag 100 may also be shut off using a power switch 104 to disable tracking or to conserve power. The power switch 104 contains an LED indicator which is used to determine if the tag 100 is powered on. The power indicator may be physically separated from the switch 103 in another embodiment.

Because the user devices 302 are likely to be smartphones, further functionality can be provided by the system. For example, connected smartphones can receive and process Amber alert type information from a source available via the Internet and automatically send queries to their associated tags 100.

In one embodiment, the tag 100 uses Radio Frequency (RF)-based Family Radio Service (FRS) and/or the General Mobile Radio Service (GMRS) bands for long range broadcasts among tags. Each tag 100 is capable of transmitting and receiving on these bands. The format used for the broadcasts is open and public and therefore may be received by any tag. This open approach is important in rescue situations where it is imperative that any tag 100 that can communicate with the tag 100 being sought will be able to do so without security restrictions. A more secure protocol may be added for specific use cases in time by extending the tag's 100 software as described above. In the preferred embodiment, broadcast will be checked for communication errors as a means to insure reliability and the integrity of the tracking information. Collisions between broadcasts are detected and corrected.

As a future enhancement, the broadcasts will be based on new emerging spectrum and technologies which will provide far greater ranges than GMRS and similar technology. Spectrum that is being freed for new uses by the FCC has not been allocated to a dedicated purpose at this time. The potential for saving lives based on the use of the tracking system will be presented as a use case for dedicating one or more specific RF bands for long range broadcasts. Even if dedicated band are not created, the new emerging technologies will provide far greater range and increase the utility of the system as a whole. The tags can also use multiple related frequencies (as available in the GMRS system) which will help avoid contention.

There are several possible preferred embodiments for the first type of wireless channel to carry the location information, including MURS, GMRS, dog tracking and animal-tracking frequencies.

Multi-Use Radio Service (MURS): See http://home.provide.net/~prsg/murs_faq.htm?iframe=true&width=100%&height=100% MURS comprises the following five frequencies:

| Channel | Frequency | Authorized bandwidth | Channel Name |
| --- | --- | --- | --- |
| 1 | 151.820 MHz | 11.25 kHz | N/A |
| 2 | 151.880 MHz | 11.25 kHz | N/A |
| 3 | 151.940 MHz | 11.25 kHz | N/A |
| 4 | 154.570 MHz | 20.00 kHz | Blue Dot |
| 5 | 154.600 MHz | 20.00 kHz | Green Dot |

Dog Collar Systems: The Federal Communications Commission (FCC) has also approved the following bands for North America—216, 217, 218, 219, 220 and 221 MHz for use in tracking dogs. Each band is then divided into a thousand different frequencies from XXX.000 to XXX.999.

GMRS: This system uses 16 UHF frequencies, eight for simplex and repeater outputs, eight for repeater inputs. Inputs and outputs are usually paired 5 MHz. apart, but any pairing of an input and output frequency is legal. CTCS (Control Tone Coded Squelch) is usual on repeaters. FCC license required, may be obtained by any individual for personal communications. Equipment must be type-certified for use in the 450-470 MHz band, 50 watts max, any antenna.

VHF from 420-460 MHz: Another available frequency band for tracking animal movements—See http://www.biotrack.co.uk/pdf/gpsuhf.pdf The Bluetooth communication standard is used by the tags 100 in the preferred embodiment as the second type of communication channel to communicate with user devices 302. Examples of user devices 302 that are Bluetooth capable include smart phones, portable computers, and vehicle-based navigation systems. The intent is to provide short range access to the tags 100 by leveraging user devices 302 commonly in use today. This approach is not limited to Bluetooth as the communication channel type and may leverage additional standards such as Near Field Communication (NFC) as consumer technology changes over time. Examples of other potential standards include 802.11b/g/n WiFi connections, Universal Serial Bus (USB) wired cables, and emerging but not yet widely used standards such as Wireless USB.

Each tag 100 contains a software accessible value that uniquely identifies it to all other tags 100 in the tracking system. The unique value does not present a simple way to identify a tag 100 for users of the system, and thus each tag 100 also in a preferred embodiment allows a user defined name to be configured for it. For users of the system, names are defined in a way that is meaningful for the tag's intended use while the unique id is used to resolve any naming conflicts that may arise during operation. In one embodiment, a user can create a list of tags 100 names or ids in the user interface via user device 302 to define the set of tags 100 for which name information will be displayed. Using this approach, users of the tracking system need only see information from tags 100 of interest, even if other tags 100 are in use and their information is available. Other options allow for other display selections such as viewing all information for all tags 100 or highlighting tags 100 which are signaling an emergency.

A basic capability of the tag 100 and the user interface 302 is the ability to, respectively, store and process location data collected over time. The history of tag 100 location is used to determine direction and velocity of a tag 100 currently or in the past. The history is also the basis for tracking a tag's 100 movement and facilitates navigation to a tag's current location or a previous location, such as the beginning of a hike. Sets of location information over an arbitrary time interval, commonly called "tracks", may be retained by tag 100. They may also be retained in the user device 302 in long term storage for display at a later time. For example, the details of the movements of one or more tags 100 can be used at a later time to retrace a route, or reviewed to understand the details of a tracking session. Any other information provided by tags 100 such tag 100 status is also retained by the system and associated with each track.

The operation of a tag 100 is protected from unwanted alteration by supporting a protocol-specific security system. In the preferred embodiment, the ability to connect to a tag 100 with a user device 302 is protected by a password which is set on a per tag 100 basis.

Figure 4:
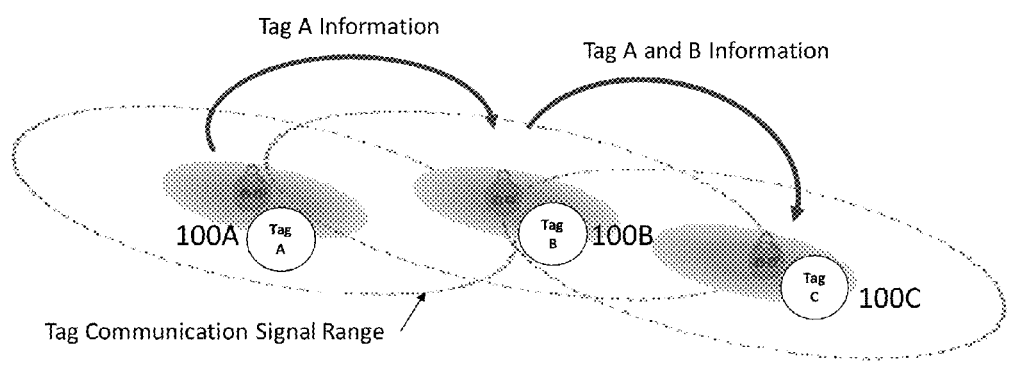
FIG. 4.—Rebroadcast functionality allows two devices that are not within communication range to share information through an intermediate tracking device.

The functionality of the tracking system is greatly improved by an optional ability of each tag 100 to rebroadcast information between tags 100 that cannot communicate directly. The approach extends the range of communication among tags. As shown in FIG. 4, if two tags 100A and 100C are too far apart to communicate directly, any tag 100B that can communicate with both tags 100A and 100C will rebroadcast location and status information such that all tags 100A, 100B, and 100C are each kept current with the locations of the others, and the tracking system as a whole maintains a complete and consistent set of information. As long as each tag 100 in the system can reach each other through intermediate tags 100 that rebroadcast, the range of the tracking system can be extended without limit by adding additional tags 100 to span distances that would otherwise be out of range.

In the preferred embodiment, all information received by a tag 100B is rebroadcast and received by all other tags 100A, 100C within its communication range. Tags 100 that would otherwise be unable to communicate receive information about each other based on the rebroadcast. In this approach it is possible that tags 100 may receive duplicate information as result of multiple rebroadcasts from multiple tags. Duplicates are ignored by comparing unique ids and sequence numbers contained in the broadcast and comparing the values to previously received information.

With all information being rebroadcast, there needs to be a way to determine when to stop or all tags 100 would continue to rebroadcast to each other forever. In the preferred embodiment, a tag 100 will never rebroadcast information that has the same unique id and sequence number as a previous broadcast. In addition, the number of devices which rebroadcast is constrained by the use of hop counts.

A hop count is a number added to a broadcast that indicates how many times it has been rebroadcast. The original sending tag 100A initially sets the hop value to one and sets the limit for the number of hops. Any tag 100B that rebroadcasts the information increments the hop count by one. The value therefore counts how many ìhopsî between tags a broadcast has taken. Tags such as rebroadcasting tag 100B are configured to not rebroadcast after a certain number of hops have been taken by a particular broadcast. The approach limits how many tags 100A, 100C can participate in a tracking session after being included by rebroadcasts. For example, if a tag 100B receives a broadcast from tag 100A which is set to limit hops to three and it receives a broadcast with a hop count of three, it will not rebroadcast and other tags 100C in its range will not receive or use the information. Without such a constraint, tracking information could conceivably be rebroadcast over an infinite number of tags 100 without limit as long as they can all reach each other using rebroadcasts.

Figure 6:
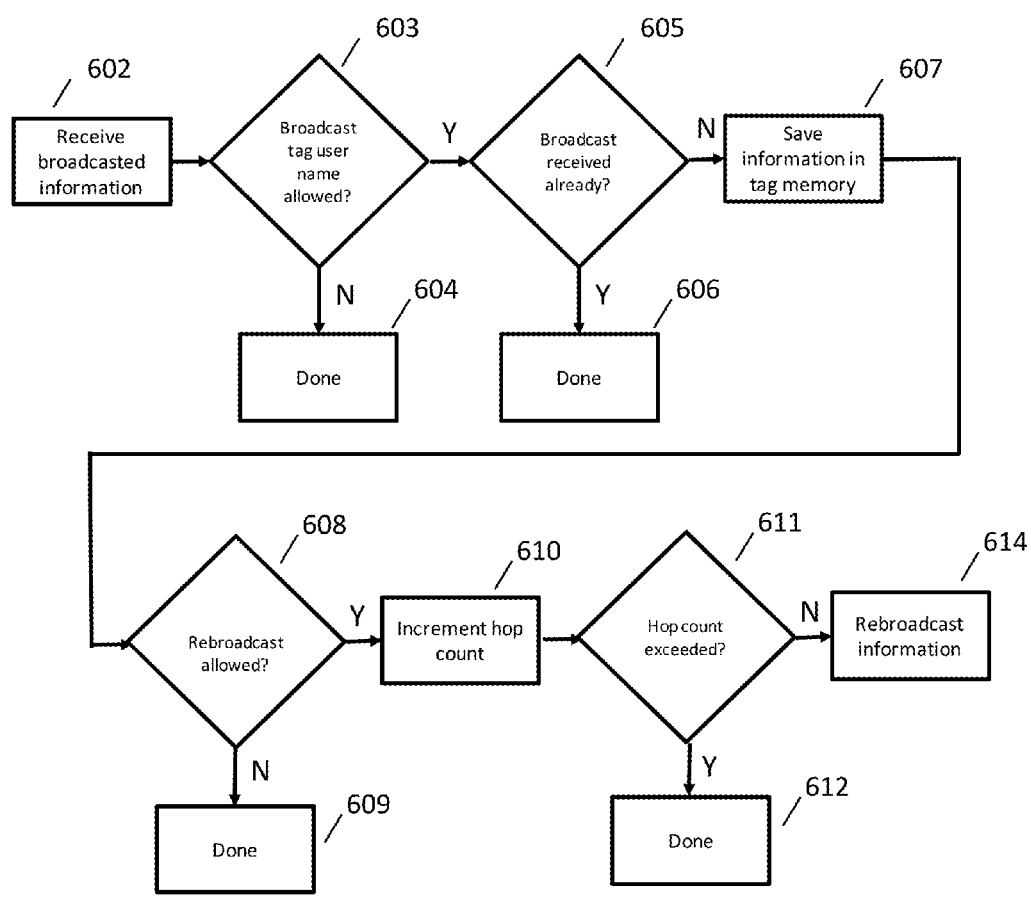
FIG. 6.—A flow diagram illustrating how a tag handles rebroadcast of received broadcast messages.

FIG. 6 illustrates the use of user name and hop count information to control broadcast of messages in one embodiment. In a first state 602 the tag 100 receives a broadcast message from another tag. State 603 then checks to see if the broadcast username associated with the recently received message is allowed if not than the process stops in state 604. If the username is allowed then state 605 determines if the same broadcast information was already received. If so the process stops in state 606. However processing otherwise continues to state 607 where the information received is then stored in the tag memory, State 608 is then entered in order to determine whether rebroadcast is enabled. If not then the process can end in state 609. If rebroadcasting is enabled in state 610 a hop count will be incremented. In state 611 it is then determined if the hop count is exceeded; if so then processing stops in state 612. If not in the message received in state 602 will be then rebroadcast in state 614.

Figure 7:
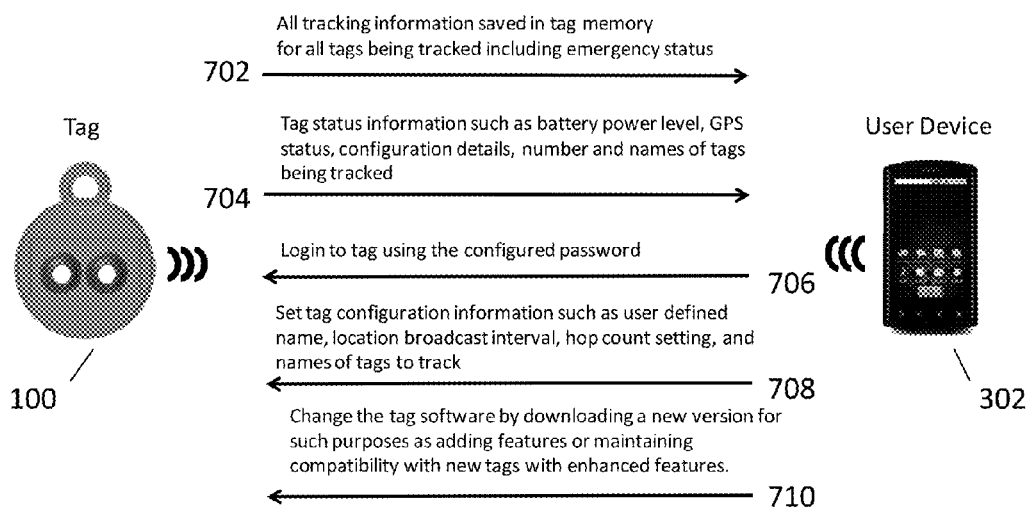
FIG. 7.—A diagram illustrating exchange of information between a tracking device and its associated user device.

FIG. 7 is a diagram illustrating the different types information that can be exchanged between a tag 100 and associated user device 302 over the short range communication interface.

For example tag tracking information saved in the memory of tag 100 for all tags being tracked including their associated emergency status can be exchanged in one state 702. In another state 704 tag status information such as battery power level, GPS status, configuration details, number and names of tags that are being tracked can also be sent by the tago 100 to user device 302.

User device 302 can also send information to the tag 100 including login to the tag using a configured password 706, setting tag configuration information such as user defined name, location broadcast interval, hop count, or the number of tags to track in 708. The user device 302 can also change the tag software by downloading new versions, or for purposes such as adding features for maintaining compatibility with two types of tags with enhanced features as in state 710.

What is claimed is:

1. A method for operating a set of tracking devices comprising:
   detecting location information via a selected one of the tracking devices;
   automatically sending a broadcast message including a unique identifier for the selected tracking device and the detected location information from the selected tracking device to one or more other tracking devices;
   automatically receiving broadcast messages from other tracking devices including unique identifiers and detected location information for the other tracking devices;
   the broadcast messages being sent and received between tracking devices over a first type of wireless communication channel;
   at least one of the tracking devices also sending and receiving messages over a second type of communication channel to a nearby user device, the user device including a general purpose computer with a user interface, the user interface to permit an operator of user device to operate the general purpose computer to send a query message to the selected one of the tracking devices to locate any tracking device of interest that is within range of another tracking device to receive the broadcast messages therefrom, even with the tracking device of interest not being directly connected to the user device and/or out of range of the first wireless communication channel;
   such that no single general purpose computing device serves as a central point for collecting and distributing location information among tracking devices, the user devices, and/or other general purpose computing devices; rebroadcasting received broadcast messages, wherein the broadcast messages further include a sequence number and wherein the broadcast messages include a hop count field and wherein the method additionally comprises: incrementing the hop count field each time a message is rebroadcast; and dropping messages having a hop count that exceeds a certain amount.

2. The method of claim 1 additionally comprising:
broadcasting emergency status information to the other tracking devices.

3. The method of claim 1 wherein the user device further executes a tracking device application program that performs one or more of:
reporting a history of location information and derived speed and/or direction of travel for the tracking device of interest;
reporting departure of the tracking device of interested outside of a defined area;
and/or displaying emergency status information for the tracking device of interest.

4. The method of claim 1 additionally comprising:
receiving configuration information from the user device at the selected tracking device to configure a time interval for automatic sending of the broadcast messages.

5. The method of claim 1 wherein the user device compares the sequence numbers from two or more received messages to discard duplicate messages received as a result of multiple rebroadcasts of the broadcast message originating from a specific tracking device.

6. The method of claim 1 additionally comprising:
receiving additional sensor information; and wherein the additional sensor information is included in the broadcast message.

7. The method of claim 1 wherein the first type of wireless communication channel is selected from a group consisting of Family Radio Service (FRS), General Mobile Radio Service (GMRS), or Multi-Use Radio Service (MURS).

8. The method of claim 1 wherein the second type of wireless communication channel is a short range unlicensed radio channel selected from a group consisting of Bluetooth, Near Field Communication, or WiFi.

9. The method of claim 1 additionally comprising:
receiving a username for the tracking device; and
including the username in the broadcast along with the unique identifier information.

10. The method of claim 1 further comprising:
in the tracking device, recording a history of location information for the tracking device and as received via broadcast from other tracking devices.

11. The method of claim 1 wherein the step of detecting location information comprises:
receiving signals from a Global Positioning System (GPS) satellite.

12. The method of claim 1 further comprising:
receiving program code from an associated user device over the second type of wireless communication channel; and
storing the program code for later execution by the tracking device.

\* \* \* \* \*